April 30, 1940. G. F. BAHR 2,199,018
GEAR SHIFT BALL
Filed Jan. 6, 1937
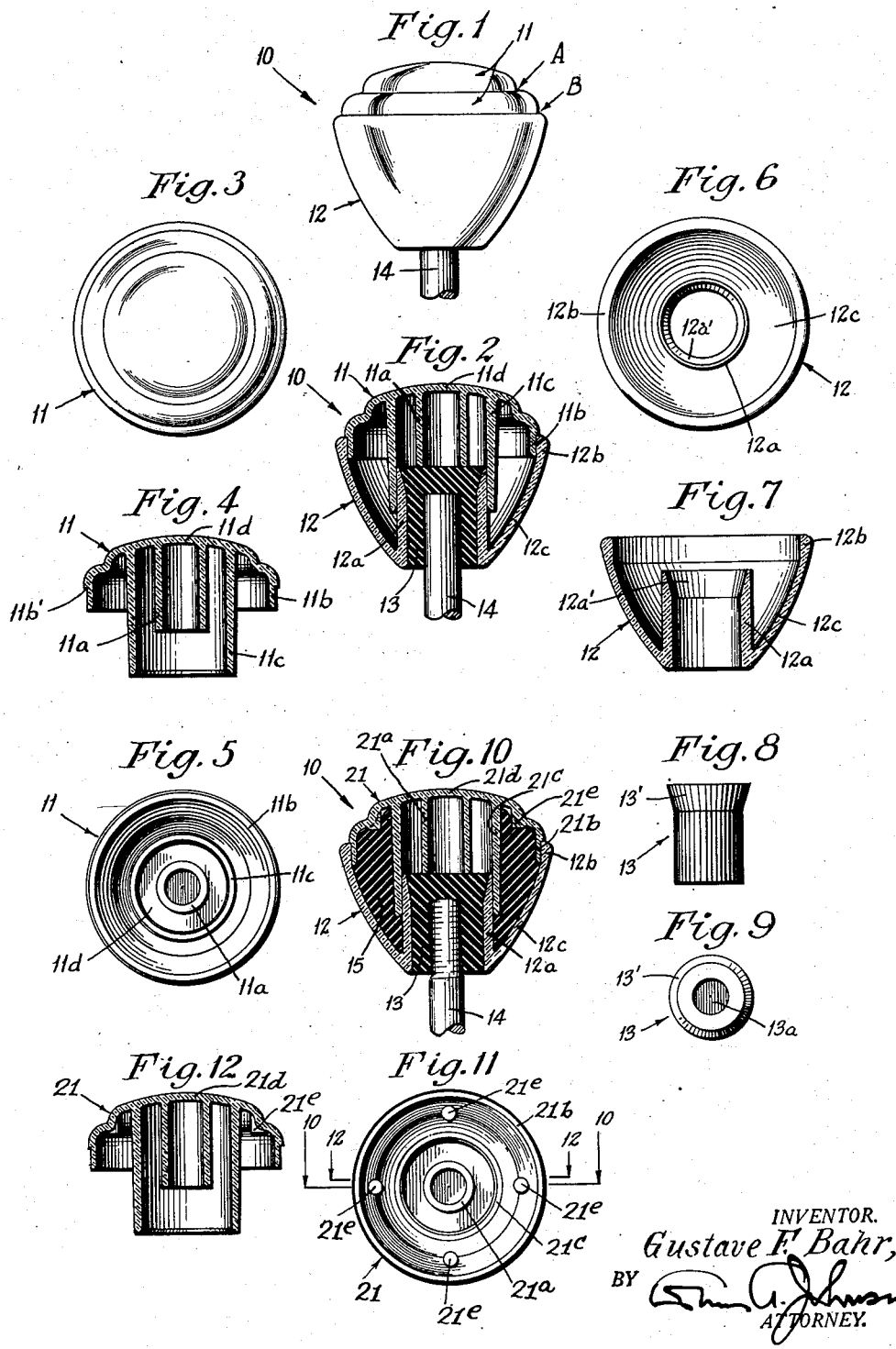
INVENTOR.
Gustave F. Bahr,
BY
ATTORNEY.

Patented Apr. 30, 1940

2,199,018

UNITED STATES PATENT OFFICE 2,199,018

GEAR SHIFT BALL

Gustave F. Bahr, Fairfield, Conn., assignor to Casco Products Corporation, Bridgeport, Conn., a corporation of Connecticut Application January 6, 1937, Serial No. 119,252

16 Claims. (Cl. 16—121)

This invention relates to knobs or balls for gear shift levers or other operating members; and, more particularly, to hollow knobs or balls incorporating a shell made up from a plurality of interfitted hollow parts.

A feature of the invention is the provision of a hollow ball having two interfitted shell parts, but with these shell parts provided with internal formations such that portions of one shell part coact with portions of the other shell part in a manner to brace and strengthen the ball in novel and valuable ways.

According to this feature of the invention, the two shell parts may be molded from a thermoplastic material to have fairly thin bounding walls, for lightness and economy, and are constructed to carry internal formations which are in the shape of a plurality of spaced annular walls so that when the ball is assembled there are provided a plurality of stiffening bands, one at the periphery of the ball and of comparatively short extent along the ball axis, and the other near the center of the ball and part of a central columnar structure of considerable height, for coacting with each other in strengthening the entire ball structure, and for other purposes.

Another feature of the invention is the provision of a ball as just described, wherein an improved socketing structure is provided for the end of the gear shift lever or the like on which the ball is to be mounted. According to this feature of the invention, said socketing structure is a part of the central columnar structure aforesaid, and is in the form of a socketing member of live rubber and hence one which acts as a shock-absorbing element. At the same time, the parts are so made and combined that the socketing member is held in place solely as the result of being engaged by and clamped between various portions of the two shell parts, yet in such manner that accidental dislodgement of the socketing member from the ball is virtually impossible.

Another feature of the invention is the provision of a loader and filler for the interior of the ball, in the shape of a preformed annulus of a compressible material like soft rubber. When such filler is present, as is preferred, the latter coacts with the two strengthening bands in increasing the strength and rigidity of the ball as a whole. At the same time, when the bounding walls of the two shell parts are made fairly thin, and hence are flexible, this flexibility combines with the compressible nature of the filler, to provide a ball which as a whole has a shock-absorbing action.

Other features and advantages will hereinafter appear.

In the accompanying drawing, which illustrates two forms of the invention as at present preferred, one omitting the filler last-mentioned, and the other incorporating the same:

Figure 1 is a side elevation of one of said embodiments secured to the end of an operating member.

Fig. 2 is an axial section, with the operating member shown in elevation.

Fig. 3 illustrates the upper shell part in top plan.

Fig. 4 is a view showing the same in axial section.

Fig. 5 is a bottom plan view thereof.

Fig. 6 illustrates the lower section part in top plan.

Fig. 7 is a view showing the same in axial section.

Fig. 8 is a side elevation of the socketing structure for the operating member.

Fig. 9 is a bottom plan view thereof.

Fig. 10, illustrating a modification which incorporates the filler aforesaid, is a view similar to Fig. 2, and an axial section as indicated by the line 10—10 of Fig. 11.

Fig. 11 is a view, similar to Fig. 5, but illustrating in bottom plan the upper shell part shown in Fig. 10.

Fig. 12 is a view, similar to Fig. 4, but showing the upper shell part of Figs. 10 and 11 according to the section line 12—12 of Fig. 11.

In the exemplifying form of the invention illustrated in the drawing, a ball 10 is shown which is approximately of acorn shape, a design at present favored for knobs for gear shift levers. It will be understood, of course, that the new ball need not be necessarily used on operating members of this kind, and that it can have such shape as the taste of the designer may dictate.

In making the ball of moldable material, as a thermoplastic one, which is desirable, the walls of the shell parts should be as thin as possible, for lightness of weight and economy of material, and yet the ball must be able to withstand the strains of service. One problem faced, especially where the ball is shaped as illustrated, that is, with its upper or crowning shell part of considerable diameter compared to its height, and with this upper shell part interfitted at a marginal portion with a marginal portion of the lower shell part, has been to provide an extremely lightweight yet dependably rugged ball. By the present invention, this problem is solved, and in a hollow ball wherein the socketing means for the gear shift lever is not only securely held in place in the ball, but functions to tightly grip the lever, and yet itself adds very little weight to the ball.

The ball shown comprises merely two shell parts, an upper or crowning one 11, and an inner one 12, and, in addition to these two shell parts a single member 13 which is a socketing member for the gear shift lever. These two shell parts are conveniently molded from such a thermoplastic material or cellulose acetate, while the socketing member is conveniently a single molding of soft or live rubber.

The upper shell part 11 is shown as provided with three concentric annular walls of differing diameters. These are an inner annular wall 11a, an outer annular wall 11b, and an intermediate annular wall 11c. The wall 11b is a marginal wall in the nature of a peripheral flange, and is here somewhat thicker than the main wall 11d of the shell part 11, to provide an annular shoulder 11b'.

The lower shell 12 is shown as provided with two concentric annular walls of differing diameters. These are an inner annular wall 12a and an outer annular wall 12b. The outer annular wall 12b of this lower shell part 12 is also in the nature of an annular flange, and is here somewhat thicker than the main wall 12c of its shell part.

The inner edge of the wall 12b is angled to establish surfaces for fitting nicely against the two surfaces of the upper shell part 11 establishing the shoulder 11b'. A bonding of these surfaces by a suitable cement or adhesive, when the two shell parts are brought together as illustrated in Fig. 2, to finally establish the ball with the socket member 13 therein, serves to lock all the parts together for obtaining the various objects of the invention. Where the shell parts are molded of cellulose acetate, such adhesive can be acetone cement.

Within the annular wall 12a is a cavity having an open bottom for receiving socketing member 13 to have the lower end thereof form a part of the outer surface of the ball at the underside thereof. At the upper interior of said wall 12a the same is shown as tapered at 12a', to match an upward annular flare 13' here present at the upper end of the member 13. This member, below such flare, is smoothly cylindrical at its exterior, to a diameter agreeing with that of the cavity within wall 12a. The member 13 is of a length equal to the height of the wall 12a, so that the top of the member 13 closes the cavity at the top of the wall 12a. The member 13 is provided with a central cylindrical hole 13a, for receiving an end of the operating member, and running up from the bottom of the member 13 to a point along its height somewhat below the lower end of the flare 13'.

Preparatory to interfitting the marginal walls of the two shell parts for cementing the same together to form the ball, the socketing member 13 is set in the cavity within the annular wall 12a. As will be understood, the member 13 is inserted endwisely into said cavity from the top of the same.

When the upper shell part 11 is placed over the parts 12 and 13, and then, cement or adhesive having been properly applied, this upper shell part is moved down until the marginal flanges 11b and 12b interfit as above described, the final assembly of the ball is completed, and the various parts thereof are disposed relative to each other for the various coactions which they are to perform in service. After hardening of the cement or adhesive, to bond the two shell parts into what is in effect one unitary structure, these coactions can occur. The cement or adhesive is desirably applied only between the marginal flanges 11b and 12b.

Considering now the completed ball, it will be noted that at the peripheral zone of the adhesive, that is, around the ball between the top of the marginal wall 12b and the bottom of the marginal wall 11b, there is a composite exterior wall for the ball which is of considerable thickness. In the present case, the external contours of the two shell parts are such that not only is the line of joinder between the two shell parts hidden, but this line is so located in regard to the general decorative shape of the ball that the appearance of the latter gives the illusion that the ball is a single unitary piece of material certain purely decorative elements of which are two strengthening indentations or groovings, marked A and B in Fig. 1. That is, each of these elements is apparently a duplicate of the other, structurally as well as decoratively. These groovings, moreover, accompanied as they are by steppings down of the inner side of the upper shell 11, add to the strength of the upper shell, particularly in regard to resistance to such strains thereon as would tend to distort the lower edge of the wall 12b from the truly circular and from its extension in a single plane perpendicular to the axis of the ball.

Thus, the coaction of the parts just described is such as to provide a stiffening plate for the ball perpendicular to its axis and which includes the upper shell part 11, and also a strengthening band, built up of the walls 11b and 12b where overlapped, for the ball at its point of maximum diameter. In the present case, the lower edge of the wall 11b is descended considerably, and to a point only slightly above the top of the wall 12a which forms the cavity for taking the member 13.

In combination with the outer strengthening band provided by the walls 11b and 12b, a second and inner strengthening band is provided; this last resulting from the fact that the wall 12a of the lower shell part is snugly surrounded over its upper portion by the lower portion of the wall 11c of the upper shell part. The overlapping of these walls is desirably considerable, the wall 11c in the present case extending down over the wall 12b to the extent of about one-half the height of the latter, and to a point well below any weakening of the wall 12b which might result from the taper 12a'.

When the two walls last-mentioned are overlapped as just described, incidental to finally properly bringing the two shell parts together, the innermost annular wall 11a depending from the upper shell part 11 is positioned so as to bear down at its lower circular edge on the top of socketing member 13, in the present case along a circular line concentric with the axis of the hole 13 of this member, but outwardly of said hole and at the same time inwardly of the outer periphery of the main cylindrical part of the member 13.

The socketing member 13 is thereby locked permanently in place in its receiving cavity, despite the fact that the ball, when made as shown in Figs. 1 to 9, is entirely made up merely of three parts, the two shell parts 11 and 12, and the socketing member. The member 13 is restrained against endwise movement outwardly of the ball by coaction of its flare 13' with the taper 12a' at the upper end of the wall 12a. The member 13 is at the same time restrained against endwise movement inwardly of the ball by the innermost annular wall 11a of the upper shell part.

Not only this, but the overlapped annular walls 11c and 12a, providing an inner strengthening band for the ball as above described additional to the outer strengthening band therefor established by the overlapped annular walls 11b and 12b, combine with the innermost annular wall 11a and the socketing member 13 to provide a central columnar bracing structure surrounding the axis of the ball. This structure effectually acts as a central bracing and strengthening column, even with the socketing member 13 of soft or live rubber, as is now preferred.

The end of the operating member 14 inserted in the hole 13a of the socketing member 13 of the ball can be plainly cylindrical, as shown in Fig. 2, or threaded, as shown in Fig. 10. In either case, I have found, the ball is readily yet securely mountable on the end of the operating member by mere endwise thrust on the ball down along the length of the operating member until the latter is sent into the hole 13a completely to fill the same.

When the socketing member is of live rubber, the operating member 14 can mount the knob or ball thereon slightly floatingly, and yet the rubber material can be such, and under such compression all over when the parts are arranged as shown in Fig. 2, that the operating member will be held against rocking relative to the axis of the ball to an extent to impose any appreciable strain on either the outer strengthening band around the periphery of the ball or the inner strengthening band around the cavity for the member 13. Any tilting of the operating member 14 relative to the axis of the ball to a sufficient extent to impose any undesirable strain on any of the annular walls participating in the makeup of the bracing structure for the ball, is prevented by the innermost annular wall 11a, which wall forms part of the central columnar bracing structure bounded circumferentially by the annular walls 11c and 12a. Any considerable tilting of the operating member 14 relative to the axis of the ball must be accompanied by an upward bulging of the top of the socketing member 13 to an extent beyond that permitted by the lower end of the innermost annular wall 11a.

In the form of the invention shown in Figs. 10, 11 and 12, the ball includes, in addition to the two shell parts 21 and 12 and the socketing part 13, a loader and filler 15. This last is preferably a single preformed annulus of soft rubber, and shaped substantially to fill the annular cavity in the ball surrounding the central bracing and strengthening column made up of the interfitted annular walls 12a and 21c, the rubber socketing member 13, and the inner annular wall 21d which acts as a thrust element against the upper end of the socketing member.

In assembling this ball, a convenient way of doing so is first to mount the socket member 13 in the lower shell part 12 as hereinabove described, and the upper part of the annulus 15 in the upper shell part 21. After this, these two collections of parts are brought together, to advance the lower part of the annulus 15 into the annular cavity in the lower shell part 12 surrounding the wall 12a and otherwise to assemble the two shell parts as shown in Fig. 10; cement having been first applied to the inner surface of annular wall 12b or to the outer surface of annular wall 21b or to both of these surfaces.

The filler 15, when present, coacts with the inner and outer strengthening bands of the ball to increase the strength and rigidity of the latter. It provides an annulus or sleeve of compressible material extending over the entire height of the ball, and backing up the outer strengthening band 21b—12b across the ball axis. At the same time, the filler provides annular ledges underlying, respectively, the bottoms of the annular walls 21b and 21c of the upper shell part 21. Practically the entire interior of the ball is filled with compressible material, except over the top of the socketing member 13, but in the hollow part of the ball last referred to the thrust means provided by the innermost annular wall 21d gives stiffness with light weight.

When the bounding walls of the two shell parts are made fairly thin as shown, and hence are rather flexible, this flexibility combines with the compressible nature of the filler 15 to provide a ball which as a whole has an appreciable shock-absorbing action and a very good "feel" to the hand of the operator.

The upper shell part 21 of Fig. 10 is shown as having a plurality of projections 21e spaced around the same and presenting downwardly directed circular horizontal faces. These faces may be placed so they merely locally increase the width of the transversely arched annular portion of the shell part 21 which merges into the annular wall 21b; but, as shown, they are depressed below said transversely arched annular portion, so that when the ball is assembled, the projections 21e act as compressing instrumentalities for the filler material. The upper portion of the filler 15 is not only shaped to fit snugly against these projecting faces, being provided with a wide and partially plane annular ledge for the purpose, but it is also shaped to fit snugly against the interior wall surfaces of the upper shell part above and below said faces. Such a construction has been found to add a marked degree of strength and rigidity to the entire ball assembly.

Variations and modifications may be made within the scope of this invention and portions of the improvements may be used without others.

I claim:

1. A molded hollow ball providing an operating knob to be mounted on an operating member comprising an upper shell part and a lower shell part, each part having a plurality of annular walls formed integrally with and of the material of the shell part whereby, when the parts are interfitted, the walls of one part overlap the corresponding walls of the other part and form a plurality of reinforced strengthening zones for the ball, one within and spaced from the other transverse to the axis upon which the ball is mounted.

2. A ball as defined in claim 1, wherein a socketing member is set in the space surrounded by the inner upstanding annular wall on the lower shell part.

3. A ball as defined in claim 1, wherein the inner zone is formed by an upstanding annular wall on the lower shell part and a depending annular wall on the upper shell part sleeving the upstanding annular wall to a point well below the top of the latter, and a socketing member is set in the space surrounded by the upstanding annular wall, there being means for holding said socketing member against endwise movement relative to the ball in either direction, said means partially carried by the lower shell part and partially carried by the upper shell part.

4. A ball as defined in claim 1, wherein the inner zone is formed by an upstanding annular wall on the lower shell part and a depending annular wall on the upper shell part sleeving the depending annular wall to a point well below the top of the latter, and a socketing member is set in the space surrounded by the upstanding annular wall, there being means for holding said socketing member against endwise movement relative to the ball in either direction, said means partially carried by said upstanding annular wall where overlapped by said depending annular wall and partially carried by the upper shell part.

5. A hollow ball providing an operating knob to be mounted on an operating member, said ball having an opening in its bottom, and comprising a lower shell part presenting said opening; an upper shell part, said shell parts having interfitting marginal portions; a socketing member for an end of the operating member and set in said opening; and means for retaining the socketing member in the ball, said socketing member being elongated in the direction of the ball axis and carrying a longitudinal hole and being over a greater cross-section near its top than near its bottom, said means including an extension upstanding from the lower shell part and surrounding the socketing member, and an extension depending from the upper shell part and engaging the top of the socketing member.

6. A hollow ball as defined in claim 5, wherein said socketing member has a cylindrical lower portion and an upwardly outwardly flared upper portion, and the upstanding extension from the lower shell is an annular wall shaped at its upper end in conformity with the flared upper portion of the socketing member.

7. A hollow ball as defined in claim 5, wherein said socketing member has a cylindrical lower portion and an upwardly outwardly flared upper portion, and the upstanding extension from the lower shell is an annular wall shaped at its upper end in conformity with the flared upper portion of the socketing member, and wherein the upper shell part includes a depending annular wall which overlaps said upstanding annular wall where the latter is shaped in conformity with the flared upper portion of the socketing member.

8. A hollow ball providing an operating knob to be mounted on the end of an operating member, comprising an upper shell part; a lower shell part marginally interfitted with a marginal portion of the upper shell part; a socketing member for the operating member, said socketing member being held in place in the ball solely by oppositely projecting and interfitting annular walls respectively carried by the two shell parts, the ball having an annular cavity surrounding said interfitting annular walls; and a filler of resiliently compressible material located in said cavity and shaped to back up annular surfaces of both filler parts.

9. A hollow ball providing an operating knob to be mounted on the end of an operating member, comprising an upper shell part; a lower shell part marginally interfitted with a marginal portion of the upper shell part; a socketing member for the operating member, said socketing member being held in place in the ball solely by oppositely projecting and interfitting annular walls respectively carried by the two shell parts, the ball having an annular cavity surrounding said interfitting annular walls; and an annular filler of resiliently compressible material in said cavity and extending substantially from the top to the bottom thereof.

10. A hollow ball providing an operating knob to be mounted on the end of an operating member, comprising an upper shell part; a lower shell part marginally interfitted with a marginal portion of the upper shell part; a socketing member for the operating member, said socketing member being held in place in the ball solely by oppositely projecting and interfitting annular walls respectively carried by the two shell parts, the ball having an annular cavity surrounding said interfitting annular walls; and a filler of resiliently compressible material located in said cavity and shaped to back up annular surfaces of both filler parts, said filler having a plurality of annular ledges, one for abutting the bottom of said marginal portion of the upper shell part, and another for abutting the bottom of that one of said interfitting annular walls which is carried by the upper shell part.

11. A hollow ball providing an operating knob to be mounted on the end of an operating member, comprising an upper shell part; a lower shell part marginally interfitted with a marginal portion of the upper shell part; a socketing member for the operating member, said socketing member being held in place in the ball solely by oppositely projecting and interfitting annular walls respectively carried by the two shell parts, the ball having an annular cavity surrounding said interfitting annular walls; and a filler of resiliently compressible material located in said cavity and shaped to back up annular surfaces of both filler parts, the upper shell part having a transversely arched inner annular surface and also having a plurality of circumferentially spaced interior projections having faces all extended in substantially a single plane, and said filler having a plurality of annular ledges, one for abutting said faces, another for abutting the bottom of said marginal portion of the upper shell part, and another for abutting the bottom of that one of said interfitting annular walls which is carried by the upper shell part.

12. In a hollow ball for the purpose described, an upper shell part having a depending marginal annular wall and a depending inner annular wall; and a lower shell part having an upstanding marginal annular wall and an upstanding inner annular wall, one of said marginal walls overlapping the other marginal wall while snugly engaging the latter, and one of said inner walls snugly receiving the other inner wall and overlapping the same.

13. A hollow ball as defined in claim 12, wherein the same also includes a live rubber socketing member housed snugly in the inner annular wall which, when the two inner annular walls are overlapped, is inside the other inner annular wall.

14. A hollow ball as defined in claim 12, wherein said socketing member has a lateral offset at its upper end and the inner wall in which said member is received is conformingly recessed at its upper end, and wherein a portion of the upper shell part is shaped and disposed to engage the top of the socketing member when the two shell parts are brought together to establish the ball.

15. A hollow ball as defined in claim 12, wherein said socketing member has a lateral offset at its upper end and the inner wall in which said member is received is conformingly recessed at its upper end, and wherein a portion of the upper shell part is shaped and disposed to engage the top of the socketing member when the two shell parts are brought together to establish the ball, said portion of the upper shell part being an annular wall lying within and spaced from the inner annular wall of the upper shell part.

16. A hollow ball providing an operating knob to be mounted on an operating member comprising upper and lower shell members having a plurality of depending walls extending axially of the same; means to hold the shells together; and resilient means interposed between said walls to reinforce said shells.

GUSTAVE F. BAHR.